Patented June 1, 1943

2,320,661

UNITED STATES PATENT OFFICE 2,320,661

PROCESS OF REMOVING PHOSPHORUS AND ARSENIC COMPOUNDS FROM VANADATE SOLUTIONS

Kurt Schneider, Bitterfeld, Germany; vested in the Alien Property Custodian

No Drawing. Application January 13, 1939, Serial No. 250,713. In Germany February 12, 1938

6 Claims. (Cl. 23—22)

This invention relates to a process of removing phosphorus and arsenic compounds from vanadate solutions.

It is known to remove arsenic and phosphorus compounds from solutions containing vanadium by treating the latter with an aqueous ammoniacal solution containing about 50 grms. of magnesium chloride and 100 grms. of ammonium chloride per litre, whereby ammonium magnesium phosphates and ammonium magnesium arsenates precipate out. These precipitated compounds can however only be separated from the solution with great difficulty owing to their slimy condition and their tendency to clog the pores of the filter. Moreover this process is extremely uneconomical, especially when large quantities of arsenic and phosphorus are to be removed from vanadate solutions.

The present invention aims at providing a process for removing phosphorus and arsenic compounds from vanadate solutions, which is free from the foregoing disadvantages.

To this end, according to the invention, alkali metal vanadate solutions containing phosphorus and/or arsenic compounds are treated with calcium vanadate so as to precipate the arsenates and/or phosphates present, in the form of insoluble calcium arsenate and/or phosphate, respectively.

The reaction proceeds in accordance with the equations:

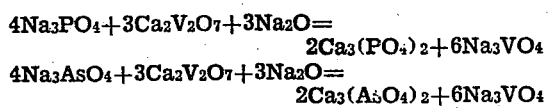

the calcium vanadate reacting with the dissolved alkali metal phosphate and/or arsenate so as to form insoluble calcium phosphate and/or arsenate and easily soluble alkali vanadate: the precipitate thus obtained is crystalline, and presents no difficulties in filtering and washing. The calcium vanadate required for the precipitation is conveniently employed in the form of so-called vanadium lime which is a mixture of various solid calcium vanadates.

In order to accelerate the reaction, the same is advantageously carried out at elevated temperatures, and preferably at about 90 to 95° C. The precipitation of the insoluble phosphates and arsenates is further promoted by vigorously stirring the reaction mixture, in which case said precipitation is generally complete after about 1 hour.

According to one mode of carrying out the invention, vanadium lime is added to the vanadate solution to be treated in an excess over that required in accordance with the foregoing equations. In this manner, a precipitate is obtained which consists of calcium phosphate, calcium arsenate, and the unconverted excess of calcium vanadate, which precipitate is separated from the solution by filtration or the like. The precipitate is then treated with a small amount of a fresh batch of alkali metal vanadate solution so as to cause the calcium vanadate still present in the precipitate to react therewith to form dissolved alkali vanadate and a further small quantity of solid calcium phosphate and/or arsenate. After washing with water, the precipitate is practically free from vanadium; the filtrate, which still contains a small proportion of alkali metal arsenates and phosphates, which have escaped conversion into the corresponding insoluble calcium compounds by means of the calcium vanadate, is then treated with a fresh portion of calcium vanadate and may for this purpose advantageously be re-combined with the main portion of the fresh alkali metal vanadate solution.

According to another mode of carrying out the invention, milk of lime or a soluble calcium salt e. g. calcium chloride, is added to the alkali metal vanadate solution to be treated so as to convert the arsenates and/or phosphates contained therein into calcium arsenate or phosphate. Also in this case, the amount of calcium compound added is preferably sufficient to convert also part of the alkali metal vanadate contained in the original solution into insoluble calcium vanadate, i. e. somewhat in excess of that required in accordance with the foregoing equations to cause precipitation of the arsenate and phosphate in the form of calcium compounds only. The composition of the precipitate thus obtained is consequently identical with the precipitate obtained in the previously described mode of carrying out the invention, and is therefore subsequently treated in exactly the same manner, the only difference being that instead of calcium vanadate (vanadium lime) milk of lime or a soluble calcium salt is employed in the precipitation stage. In cases where the alkali metal vanadate solutions to be purified contain arsenic in the state of arsenite, such solutions can be conditioned for subsequent treatment by the process of the present invention, by subjecting them to an oxidising treatment by means of an oxidising agent such as chlorine, hydrogen peroxide and the like, so as to convert the arsenite present therein, into arsenate.

Example

An alkali metal vanadate solution containing 10.1 grams of $V_2O_5$, 0.87 gram of As and 0.31 gram of P per litre is treated at 95° C. for one hour while vigorously stirring, with ten times the amount of vanadium lime theoretically required for the precipitation of the arsenic and phosphorus present. After separation of the precipitate formed the solution obtained contains 13.56 grams of $V_2O_5$, 0.014 gram of As and 0.016 gram of P per litre. After washing the precipitate with a further quantity of the alkali metal vanadate solution and subsequent washing with water, said precipitate contains, besides calcium phosphate and calcium arsenate, only 0.28% of $V_2O_5$.

I claim:

1. A process for removing phosphorus and arsenic compounds from alkali metal vanadate solutions which comprises treating the alkali metal vanadate solution with solid calcium vanadate so as to precipitate the arsenates and phosphates present in the form of the corresponding insoluble calcium compounds.

2. A process for removing phosphorus and arsenic compounds from alkali metal vanadate solutions which comprises treating the alkali metal vanadate solution with an excess of solid calcium vanadate over that required to precipitate the arsenates and phosphates present in the form of the corresponding insoluble calcium compounds.

3. A process for removing phosphorus and arsenic compounds from alkali metal vanadate solutions which comprises treating the alkali metal vanadate solution with solid calcium vanadate so as to precipitate the arsenates and phosphates present in the form of the corresponding insoluble calcium compounds, while vigorously stirring the reaction mixture.

4. A process for removing phosphorus and arsenic compounds from alkali metal vanadate solutions which comprises treating the alkali vanadate solution at elevated temperatures with solid calcium vanadate so as to precipitate the arsenates and phosphates present in the form of the corresponding insoluble calcium compounds.

5. A process for removing phosphorus and arsenic compounds from alkali metal vanadate solutions which comprises treating the alkali vanadate solution at temperatures of about 90 to 95° C. with solid calcium vanadate so as to precipitate the arsenates and phosphates present in the form of the corresponding insoluble calcium compounds.

6. A process for removing phosphorus and arsenic compounds from alkali metal vanadate solutions which comprises treating the alkali metal vanadate solution with an excess of solid calcium vanadate over that required to precipitate the arsenates and phosphates present in the form of the corresponding insoluble calcium compounds, separating the precipitate from the solution by filtration and heating the precipitate with a small quantity of fresh alkali metal vanadate solution, whereby the calcium vanadate contained in the precipitate is re-converted into alkali metal vanadate.

KURT SCHNEIDER.